United States Patent [19]

Visser

[11] 4,384,271

[45] May 17, 1983

[54] TRAFFIC LIGHT

[75] Inventor: Cornelis A. Visser, Eindhoven, Netherlands

[73] Assignee: U.S. Philips Corporation, New York, N.Y.

[21] Appl. No.: 160,703

[22] Filed: Jun. 18, 1980

[30] Foreign Application Priority Data

Jun. 20, 1979 [NL] Netherlands ........................ 7904815

[51] Int. Cl.[3] .......................... B60Q 1/00; G02B 5/12

[52] U.S. Cl. ...................................... 340/119; 340/50; 340/84; 340/87; 340/118; 350/101; 350/104; 362/241; 362/243; 362/245

[58] Field of Search .................... 340/84, 87, 119, 103, 340/50, 122, 118; 350/97, 104, 101, 266, 288, 285, 290, 293, 296, 167, 168, 169, 171, 172, 107; 362/166, 169, 241, 242, 243–248

[56] References Cited

U.S. PATENT DOCUMENTS

| | | | |
|---|---|---|---|
| 1,219,514 | 3/1917 | Whitney | 340/103 |
| 1,548,984 | 8/1925 | Day | 340/103 |
| 1,918,480 | 7/1933 | Moore | 340/50 |
| 3,253,255 | 5/1966 | Nagel | 340/50 |
| 3,639,899 | 2/1972 | Ljungkull | 340/84 |

FOREIGN PATENT DOCUMENTS

| | | | |
|---|---|---|---|
| 424062 | 10/1924 | Fed. Rep. of Germany | 340/50 |
| 1951199 | 8/1973 | Fed. Rep. of Germany | 340/50 |

*Primary Examiner*—John W. Caldwell, Sr.
*Assistant Examiner*—Donnie Lee Crosland
*Attorney, Agent, or Firm*—Robert S. Smith

[57] ABSTRACT

A traffic light construction which provides a signal of a high luminous intensity, a gradual brightness variation over a cover glass and a considerable suppression of phantom phenomena. The traffic light has a parabolic reflector having a depth of about its focal length and a converging lens smaller than the cover glass. The lens produces a parallel light beam, which is incident on the central portion of the cover glass which is outside the reach of the parallel beam formed by the reflector.

1 Claim, 3 Drawing Figures

TRAFFIC LIGHT

The invention relates to a traffic light comprising a parabolic reflector, a light source and a converging lens the light source being arranged in the common focal point of the reflector and the lens, the reflector having a depth of about its focal length.

A traffic light is understood to be in this specification an installation having at least one light emitting element for making traffic signals.

West German Patentschrift No. 1 951 199 describes measures to be taken for traffic lights to suppress so-called phantom phenomena. This phenomena relates to extraneous light from an external source being reflected by the reflector so that the traffic light appears to be illuminated.

The measures mentioned in the German patent specification are, inter alia, the provision of reflecting prisms on the cover glass, so that the extraneous light is laterally deflected, or the provision of weakly reflecting means on the outside of the cover glass, so that the extraneous light is prevented from entering the traffic light. However, these measures reduce the intensity of the light emitted by the traffic light. To counteract phantom phenomena, the German patent specification therefore proposes the provision of a thin-walled conical surface, which tapers from the lens to the light source, of light absorbing material, the reflector being a narrow ring disposed between the focal plane of the reflector and the cover glass. Since only a narrow, annular reflector is used, additional measures must be taken in this known construction in order to utilize the luminous flux of the light source to the full. This requires the use of a lens having a relatively large diameter. Furthermore a second, spherical reflector is provided behind the light source. Owing to these components the whole system is of a relatively large size, and the construction is complicated, expensive and heavy.

It is an object of the invention to provide a traffic light which produces a signal of a high luminous intensity, has a gradual brightness variation over the cover glass, is compact, and whose phantom phenomena are greatly reduced.

In accordance herewith, the invention provides a traffic light of the type mentioned in the opening paragraph, which is characterized in that the lens is smaller than a cover glass. The reflector is present behind substantially the whole area of the cover glass, said lens being so dimensioned that substantially no light reflected from the reflector passes therethrough in a direction parallel to the optical axis of the lens. (The lens 10 is radially symmetrical and thus inherently has an optical axis.)

It has become apparent that a considerable reduction of the phantom phenomena is realized when the parabolic reflector has nearly the same depth as its focal length. It is therefore not necessary to take special provisions such as absorption planes in a traffic light according to the invention to suppress phantom phenomena. The reflector of the traffic light according to the invention may have an aperture to accommodate the light source, for example a (halogen) incandescent lamp in a lamp holder.

Alternatively, it is possible to mount the lamp on connection means secured to the reflecting surface of the reflector. In both cases a portion of the light radiated by the light source to the rear, that is to say in a direction towards the reflector, cannot be reflected by the reflector and cause a reduced brightness in the center of the cover glass. To avoid this a lens of only a small size is arranged near the central portion of the cover glass. A Fresnel lens is particularly advantageous. The lens causes a central portion of the cover glass to be irradiated by a parallel beam of direct light, whereas the parabolic reflector irradiates the cover glass portion surrounding the said central portion with a parallel beam of reflected light. This results in a gradual brightness variation on the cover glass.

It should be noted that German patent specification No. 424,062 discloses a traffic light which comprises a parabolic reflector having a depth which is substantially equal to its focal length, a lens also being present. In this traffic light there is, however, no cover glass in front of the reflector.

The transverse dimensions of the lens are preferably equally as large as the transverse dimensions of the reflector portion which is not irradiated by the light source due to the presence of a lamp holder, a lamp base of the light source or connecting means for the light source. Should the transverse dimensions of the lens be much greater the phantom effect might reoccur. In a preferred embodiment the focal length of the lens is at least equal to that of the reflector causing a further reduction of phantom phenomena. In a further preferred embodiment the focal length of the lens is equal to that of the reflector in order to obtain a substantially equal brightness of the central and the remaining portion of the cover glass.

The lens is preferably secured to the cover glass. The light source is then easy to access and easy to replace after the door of the traffic light housing has been opened.

In a special embodiment the lens comprises colorless, transparent spokes which have a constant thickness whereby the emerging light rays are parallel to the corresponding incident light rays. The spokes extend to the periphery of the cover glass and are connected there to the cover glass. (The spokes are plane-parallel with the light rays). Polycarbonate is a suitable material for these spokes and the lens.

An embodiment of a traffic light according to the invention is shown in the drawing wherein.

Figure 1:
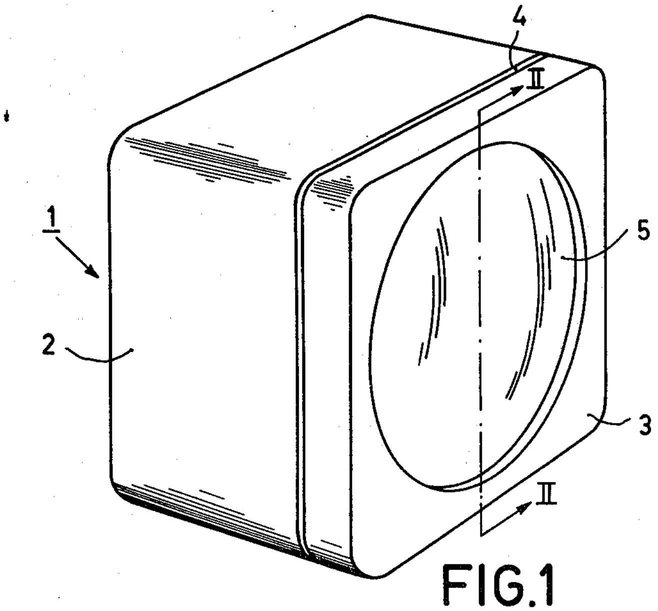
FIG. 1 is a perspective view of a traffic light.

FIG. 1 shows a traffic light comprising a housing 1. The housing 1 comprises a first part 2, which forms an illuminator, and a second part 3, which forms a door for the illuminator 2. The illuminator 2 has a narrow rim 4 which the door 3 engages in the closed condition. The door 3 is attached in a hingeable manner to the illuminator 2 by means of a hinge (not shown). A cover glass 5 is present in the door 3.

Figure 2:
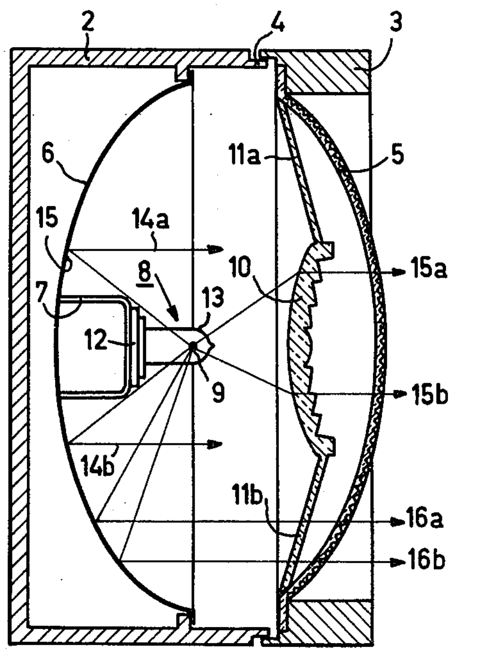
FIG. 2 is a cross-sectional view through the traffic light shown in FIG. 1.

FIG. 2 shows the cover glass 5 which consists of profiled, colored glass. A parabolic reflector 6, which extends over substantially the whole area of the cover glass 5, is present in the illuminator 2 of the traffic light. The depth of the reflector in the embodiment shown in FIG. 2 is the same as its focal length. The parabolic reflector supports a lamp holder 7, which accommodates a light source 8 comprising an incandescent lamp having a filament 9. A colorless, transparent plastic Fresnel lens 10 is connected to the cover glass 5 by means of transparent colorless supporting spokes 11*a* and 11*b*, which have a constant thickness whereby the emerging light rays are parallel to the incident light rays, said spokes being directed to the periphery of the cover glass. The filament 9 surrounds the common focal point of the reflector 6 and the lens 10. The focal length of lens 10 is equal to or greater than that of the reflector. A centering ring 12 is secured to the lamp vessel 13 of the light source 8 to enable the filament to be centered on the common focal point. The light rays 14*a* and 15*b* define the limits of an area 15 of the reflector 6 in which no light from the filament is incident and also define the transverse limits of lens 10. As a result, no reflected light passes through lens 10. The lens 10 converges direct radiation emitted from the filament towards the lens to form a parallel beam 15*a*, 15*b*. Outside the central portion of the cover glass 5 covered by the lens 10 the reflector 6 projects a parallel beam (rays 16*a* and 16*b*) to the cover glass.

In a particular example, the cover glass 5 was of colored prismatically profiled glass to act as a light diffuser. The diameter of the cover glass was approximately 20 cm, the focal lengths of the lens and of the parabolic reflector were approximately 5 cm and the reflector depth was also 5 cm. The light source was a halogen incandescent lamp having a power of 50 W. Centering ring 12 had a diameter of approximately 2 cm. The thickness of the spokes was about 2 mm.

Figure 3:
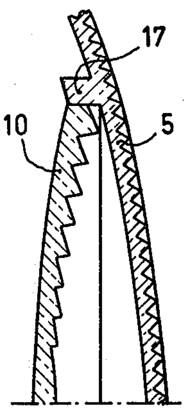
FIG. 3 shows an alternative manner of connecting the lens to the cover glass.

In FIG. 3 the lens 10 is attached to the cover glass 5 by clamping it between projections 17 on the cover glass 5.

What is claimed is:

1. A traffic light comprising a parabolic reflector, a light source, and a converging lens, the light source being arranged in the common focal point of the reflector and the lens, the reflector having a depth substantially equal to the focal length thereof, a cover glass, said lens being smaller than said cover glass, said reflector extending over substantially the whole area of said cover glass intermediate said cover glass and said light source, said lens being so dimensioned that substantially all light reflected from the reflector passes therethrough in a direction oblique to the optical axis of said lens, the traffic light further including mounting means for said light source, said mounting means blocking all light from reaching said reflector in a central portion of said reflector, the transverse dimensions of said lens corresponding to the transverse dimensions of said central portion of said reflector, and the focal length of said lens being at least equal to that of said reflector, said lens being directly carried on said cover glass, said cover glass having a periphery, said lens being supported with colorless, transparent supporting spokes which have a constant thickness whereby the emerging light rays are parallel to the corresponding incident light rays, said spokes extending to and connected to the periphery of said cover glass.

* * * * *